(12) United States Patent
Hou et al.

(10) Patent No.: US 7,543,380 B2
(45) Date of Patent: Jun. 9, 2009

(54) HEAT PIPE AND METHOD FOR SEALING THE HEAT PIPE

(75) Inventors: Chuen-Shu Hou, Tu Cheng (TW);
Cheng-Chi Lee, Tu Cheng (TW);
Chao-Nien Tung, Tu Cheng (TW);
Tay-Jian Liu, Tu Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 301 days.

(21) Appl. No.: 11/308,851

(22) Filed: May 15, 2006

(65) Prior Publication Data
US 2008/0012308 A1  Jan. 17, 2008

(30) Foreign Application Priority Data
Oct. 11, 2005  (CN)  .................. 2005 1 0100393

(51) Int. Cl.
*B21D 53/06* (2006.01)
(52) U.S. Cl. ................................. 29/890.032
(58) Field of Classification Search ................. 285/382, 285/288.1, 286.1; 29/890.032, 890.053, 29/890.06
See application file for complete search history.

(56) References Cited

U.S. PATENT DOCUMENTS

| | | | | |
|---|---|---|---|---|
| 3,292,414 A | * | 12/1966 | Goeke | 29/890.053 |
| 3,680,189 A | * | 8/1972 | Noren | 29/890.032 |
| 6,013,890 A | * | 1/2000 | Hulsizer | 219/76.14 |
| 6,463,911 B1 | * | 10/2002 | Treusch et al. | 123/467 |
| 6,568,370 B1 | * | 5/2003 | Treusch et al. | 123/467 |
| 6,781,083 B1 | * | 8/2004 | Keller et al. | 219/76.15 |
| 6,871,635 B2 | * | 3/2005 | Curran et al. | 123/456 |
| 6,957,691 B2 | * | 10/2005 | Hsieh | 165/104.26 |
| 7,073,257 B1 | * | 7/2006 | Hsu | 29/890.032 |
| 7,192,064 B2 | * | 3/2007 | Hsu | 285/382 |
| 7,229,104 B2 | * | 6/2007 | Hsu | 285/382 |
| 2005/0167984 A1 | | 8/2005 | Hsu | |

FOREIGN PATENT DOCUMENTS

| | | |
|---|---|---|
| CN | 2658696 Y | 11/2004 |
| JP | 9-89480 A | 4/1997 |
| TW | 591194 | 6/2004 |
| TW | M241975 | 8/2004 |
| TW | M271632 | 8/2005 |

* cited by examiner

*Primary Examiner*—David E Bochna
(74) *Attorney, Agent, or Firm*—Frank R. Niranjan

(57) ABSTRACT

A heat pipe includes a body with working fluid contained therein and a sealing structure forming on an end of the body. The sealing structure includes a single layer sealing portion formed at a distal end thereof. The sealing structure further comprises a two layer sealing portion connecting the single layer sealing portion to the body. The single layer and two layer sealing portions and the body are made of the same metallic material. A method for sealing the heat pipe, includes the steps of: (1) providing a metallic pipe with an end sealed and an opposite open portion; (2) pressing the open portion of the pipe to form a two layer sealing portion; (3) melting at least one part of the two layer sealing portion to form a single layer sealing portion.

8 Claims, 10 Drawing Sheets

HEAT PIPE AND METHOD FOR SEALING THE HEAT PIPE

FIELD OF THE INVENTION

The present invention relates to heat pipes, and more particularly to a method for sealing heat pipes.

DESCRIPTION OF RELATED ART

Today, heat pipes are among the chief instruments used to keep electronic components such as central processing units (CPUs) working within a tolerable range of temperature. A heat pipe usually includes a cylindrical body with a cavity defined therein and a quantity of working fluid contained in the cavity. The heat pipes transfer heat originating at the CPUs away through phase transition of the working fluid; the cavities inside the pipes are vacuum-exhausted to form a vacuum thus making the working fluid easy to evaporate. The more perfect the vacuum in the heat pipe, the lower the temperature at which the heat pipe begins to work. Thus, it is required for the heat pipe to be hermetically sealed after being vacuum-exhausted by forming a sealing structure. The sealing structure of the heat pipe is a key factor, which may lead to an adverse rise in the pressure in the heat pipe. People skilled in this art are trying hard to look for a method for manufacturing a sealing structure, which may keep the pressure in the heat pipe within a certain range.

A conventional method for sealing a heat pipe is illustrated in FIGS. 9-10. This method includes the following steps:

Step 1: providing a metallic hollow body 4 with an open end portion;

Step 2: pressing the open end portion of the hollow body 4 using a pair of press molds 2 to form a flatten end portion 6 closing the open end portion;

Step 3: cutting a top end of the flatten end portion 6 away and sealing the heat pipe by using a spot welding device to achieve a two layer sealed structure.

As described above, the sealing structure is of double layers of transformative metal, the metal has flexibility and trends to resile (i.e. return to its previous form), which may adversely result in tiny slots or pores forming on an interface between the two layers. Although the sealing structure can be further processed by welding with solder such as tin-lead alloy, thermal stresses inevitable result due to different thermal expansion coefficients of the body 4 and the solder. The thermal stresses are mainly distributed in areas near the welding seam. The area near the welding seam is the weakest area of the joint, where cracks are likely to initiate. Air outside the heat pipe may leak into the heat pipe along the slots or pores or cracks and re-pressurize the heat pipe, making the working fluid difficult to evaporate.

What is needed, therefore, is a heat pipe and a method for sealing the same, which can overcome above-described disadvantage of the prior art.

SUMMARY OF THE INVENTION

A heat pipe comprises a body with working fluid contained therein and a sealing structure formed on one end of the body. The sealing structure comprises a single layer sealing portion formed at a distal end thereof. The sealing structure further comprises a two layer sealing portion connecting the single layer sealing portion to the body. A method for sealing the heat pipe comprises the steps of: (1) providing a metallic pipe with an end sealed and an opposite open portion; (2) pressing the open portion of the pipe to form a two layer sealing portion; (3) melting at least one part of the two layer sealing portion to form a single layer sealing portion.

Other advantages and novel features will become more apparent from the following detailed description of preferred embodiments when taken in conjunction with the accompanying drawings, in which:

DETAILED DESCRIPTION OF THE INVENTION

Figure 1:
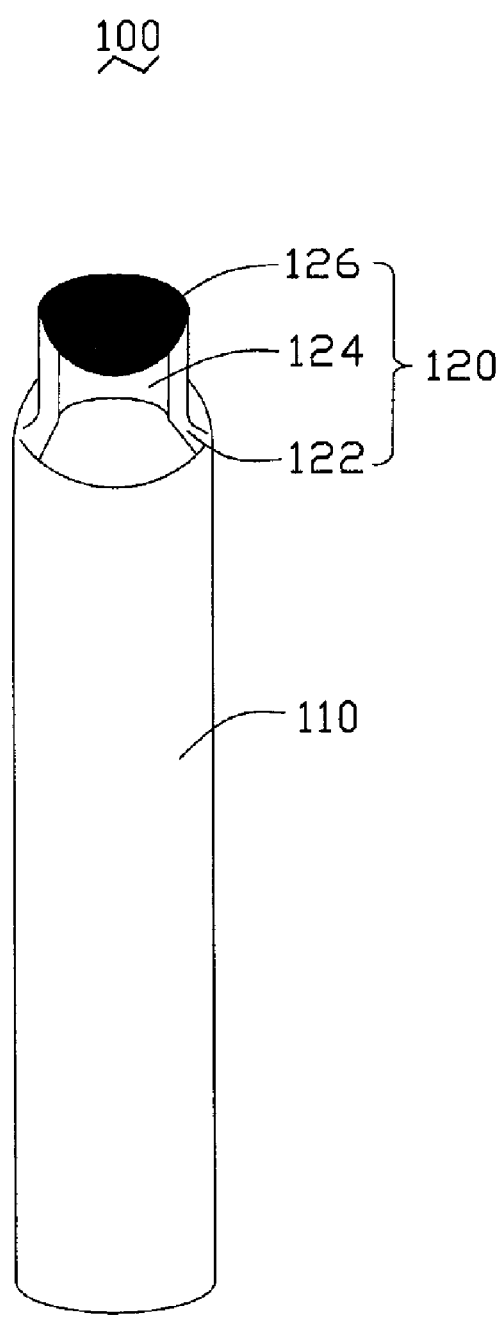
FIG. 1 is a perspective view of a heat pipe with a sealing structure in accordance with a preferred embodiment.

Referring to FIG. 1, a perspective view of a heat pipe 100 with a sealing structure 120 in accordance with a preferred embodiment is illustrated. The heat pipe 100 comprises a metallic body 110 with the sealing structure 120 formed on a distal end thereof, such that the interior of the heat pipe 100 is air-tight and working fluid contained in the body 110 can properly perform phase transition, allowing a normal operation of the heat pipe 100. The sealing structure 120 comprises a shrinkage portion 122 extending from the body 110, a single layer sealing portion 126 and a two layer sealing portion 124 connecting the single layer sealing portion 126 to the shrinkage portion 122. The single layer and the two layer sealing portions 126, 124 are made of the same metallic material, such as copper or aluminum, for forming the metallic body 110.

To prepare the sealing structure 120, a method for manufacturing the sealing structure 120 comprises the following steps.

Figure 2:
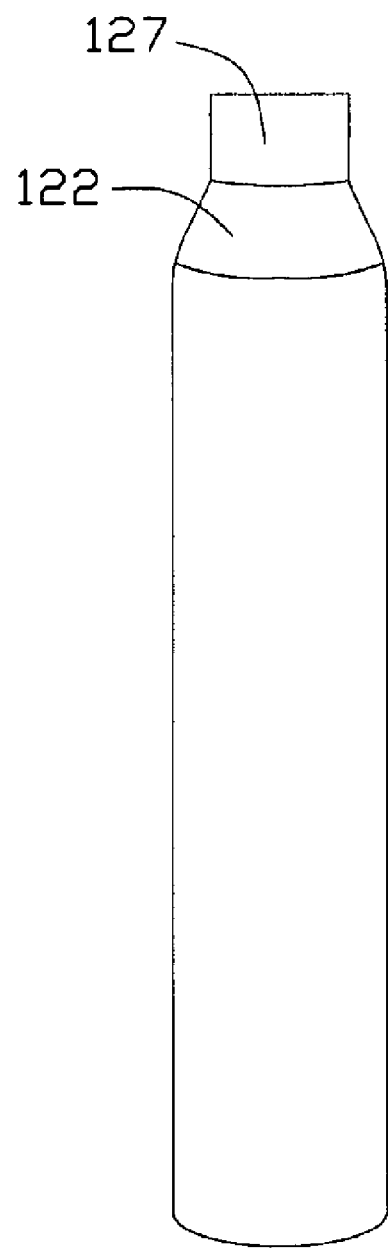
FIG. 2 is perspective view of a pipe prepared for manufacturing the heat pipe.

Step (1) Providing a metallic pipe with a bottom end sealed and a top open portion 127 as shown in FIG. 2. Preferably, a shrinkage portion 122 is formed by a shrinking operation and joints the pipe and the top open portion 127 together.

Step (2) Transversely pressing the top open portion 127 of the pipe to form a two layer sealing portion 124, which has a semi-circular cross section to close the top open portion 124 primarily.

Figure 3:
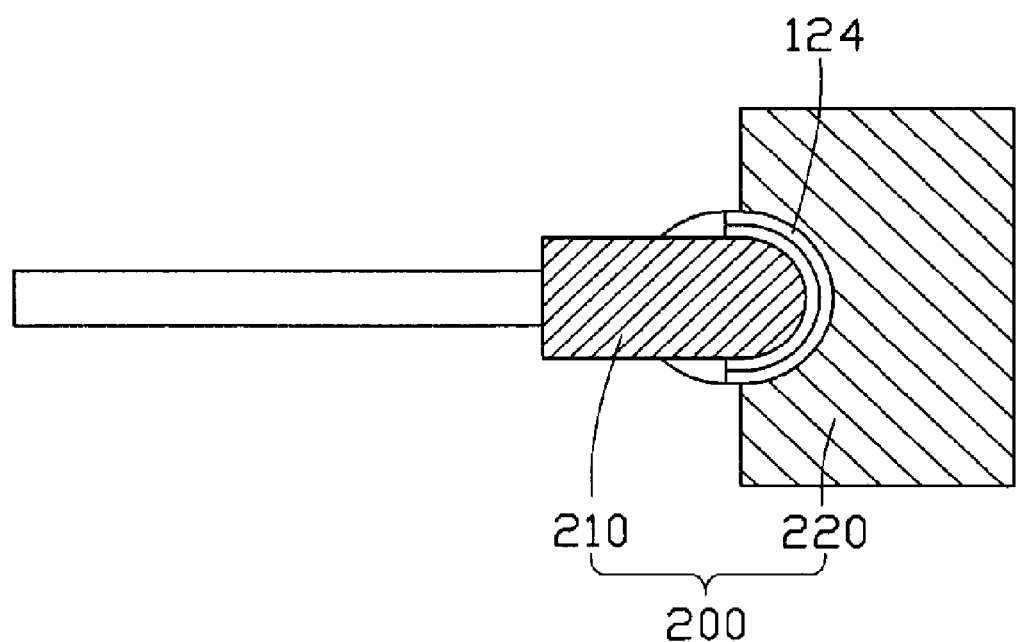
FIG. 3 is a top cross-sectional view of a pair of press molds for flattening a top open portion of the pipe to form a two layer sealing portion at a first stage.
Figure 4:
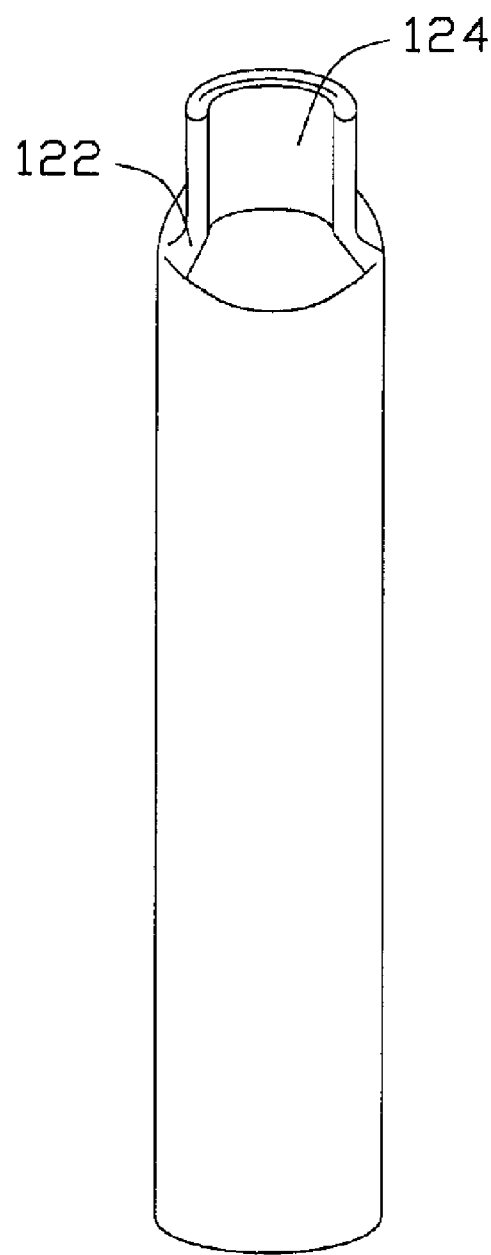
FIG. 4 is a perspective view of the pipe after the first stage.

As shown in FIGS. 3-4, the top open portion 127 of the pipe is disposed in a pair of press molds 200, which includes a first mold 210 and a second mold 220. The first mold 210 has a convex semi-circular contacting surface, while the second mold 220 has a concave semi-circular contacting surface. Therefore, by placing the top open portion 127 of the vertically extending pipe between the first mold 210 and the second mold 220 and pressing the first mold 210 towards the second mold 220, one half of the sidewall at the top open portion 127 of the pipe is pressed towards the other half of the sidewall. The top open portion 127 of the pipe is pressed into a shape with a double-layered semi-circular cross section, that is the two layer sealing portion 124. After this step (2), the top open portion 127 of the pipe is closed.

Step (3) Melting an outer part of the two layer sealing portion 124, thus forming a single layer sealing portion 126.

Figure 5:
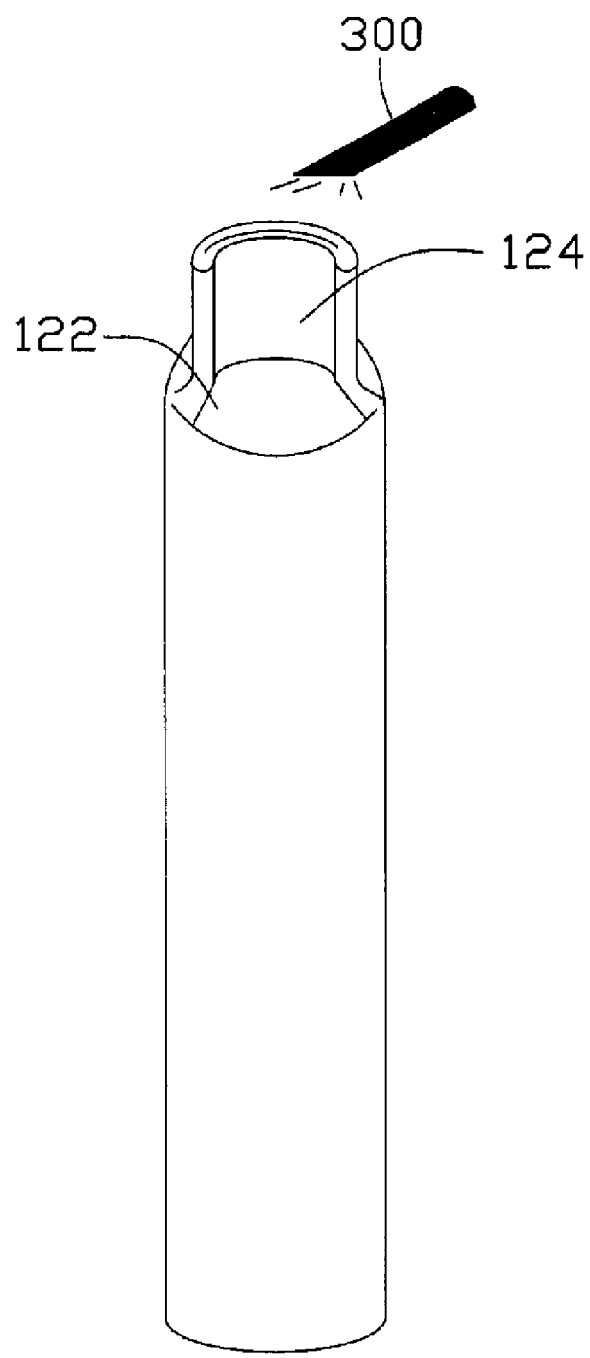
FIG. 5 shows a process of melting the two layer sealing portion at a second stage.

As shown in FIG. 5, the outer part of the two layer sealing portion 124 is heating up to melt by using tungsten arc inert gas welding (TIG) such as argon arc welding 300. When the melt material becomes cooler and eventually collects together, the single layer sealing portion 126 is formed. Then, the process of sealing the heat pipe is completely finished. During the melting operation, if an area of the two layer sealing portion 124 to be melted is not covered by the arc, the pipe may turns on its own axis to uniformly heat up the area; otherwise, the pipe may be fixed with no need for rotation.

Figure 6:
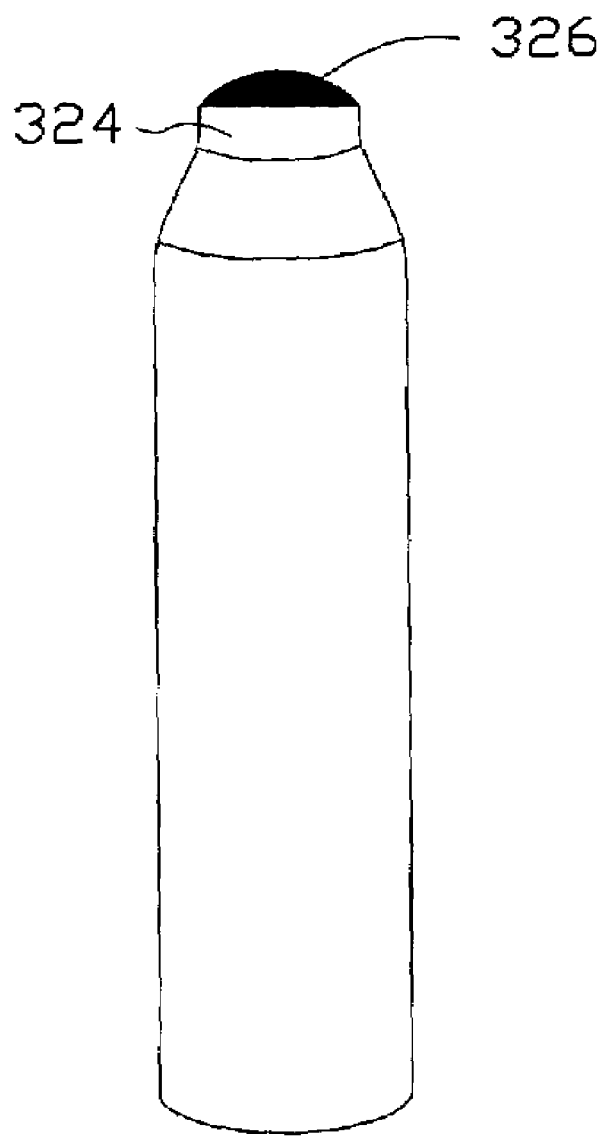
FIG. 6 shows another heat pipe having a different sealing structure from that of FIG. 1.
Figure 7:
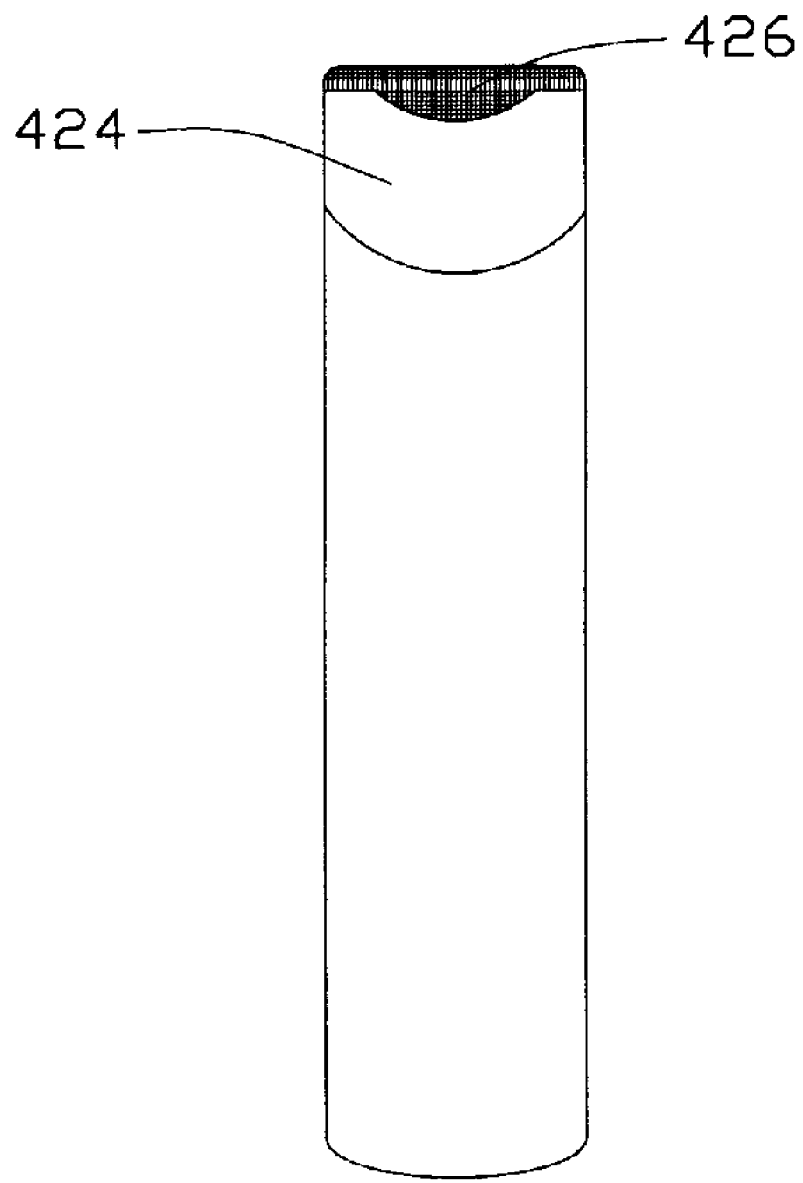
FIG. 7 shows another heat pipe having a different sealing structure from that of FIG. 1.
Figure 8:
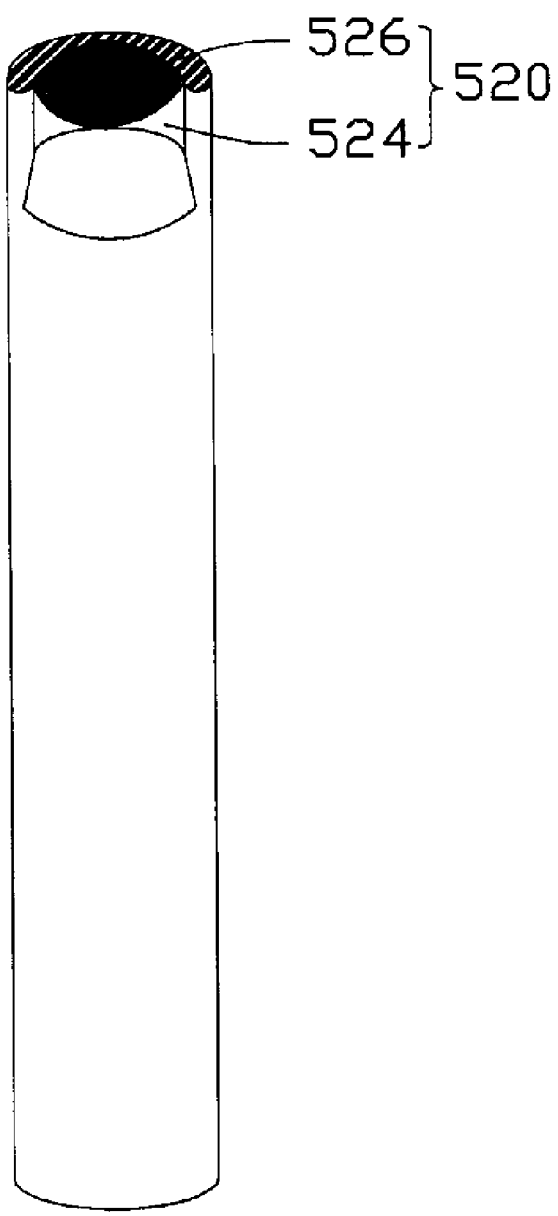
FIG. 8 shows another heat pipe having a different sealing structure from that of FIG. 1.
Figure 9:
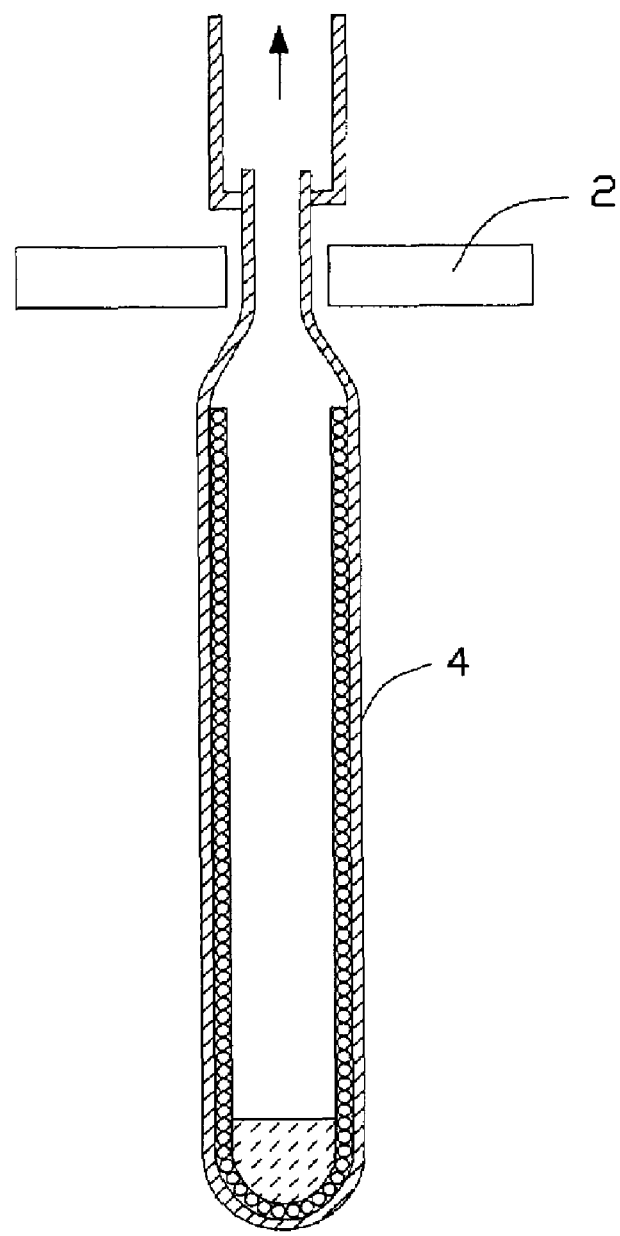
FIG. 9 is a process of a conventional method for sealing a heat pipe.
Figure 10:
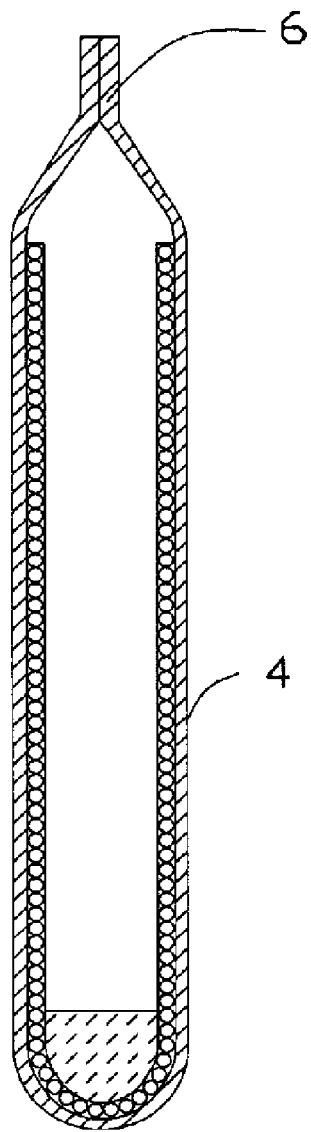
FIG. 10 is a sectional view of a heat pipe manufacture by the conventional method.

As shown in FIG. 1, the sealing structure 120 can be divided into a shrinkage portion 122, a single layer sealing portion 126 and a two layer sealing portion 124. The two layer sealing portion 124 has a semi-circular cross section, and extends from the shrinkage portion 122. However, the detailed structures of the sealing structure 120 may be changed according to actual application. For example, another three heat pipes each with different sealing structures are shown in FIG. 6-8. For one embodiment, when the press molds are in the form of flat contacting surfaces, a two layer sealing portion 324 with a rectangular cross section will be formed; in this embodiment, the single layer sealing portion 326 also have a substantially rectangular cross section after the melting operation.

For another embodiment, the pipe is without the shrinkage portion. When the press molds are in the form of flat contacting surfaces, a two layer sealing portion 424 and a single layer sealing portion 426 will have rectangular cross sections. When the first mold has a convex semi-circular contacting surface, while the second mold has a concave semi-circular contacting surface, the sealing structure 520 will be divided into a two layer sealing portion 524 with a semi-circular cross section and a single layer sealing portion 526 formed at distal end of the two layer sealing portion 524. The two layer sealing portion 524 extends from the pipe directly without the interconnecting shrinkage portion. For another embodiment, the whole of the two layer seal may be melted to form a single layer sealing structure, which connects to the body directly.

Accordingly, the sealing structure described above has at least the following advantages:

1. Outer part or the whole of the two layer sealing portion is melted to form the single layer sealing portion. Therefore, the resiling problem of the conventional structure is resolved.

2. In the melting operation for producing the single layer sealing portion, outer part of or the whole of the two layer sealing portion is melted, and the length of an ineffective portion of the sealing structure is shortened. An ineffective portion is a part of a heat pipe which can not transfer heat through phase transition and which adversely affects heat transferring capability of the heat pipe. The length of the ineffective portion of the sealing structure of the preferred embodiments is about 2-5 mm shorter than that of the conventional sealing structure. This makes good use of the heat pipe. Furthermore, the ineffective portion of the sealing structure is melted to seal the heat pipe; this avails to make full use of the material of the pipe. This is also in strong contrast to the conventional method having to cut off a part of the heat pipe.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for sealing a heat pipe, comprising the steps of:
providing a metallic pipe with an end sealed and an open portion at an opposite end;
pressing the open portion of the pipe to form a two layer sealing portion; and
melting at least one part of the two layer sealing portion to form a single layer sealing portion, wherein the single layer sealing portion, the two layer sealing portion and the pipe are made of the same metallic material;
wherein the melting by applying a tungsten arc inert gas welding to the at least one part of the two layer sealing portion.

2. The method as claimed in claim 1, wherein the press operation further comprises a step where the open portion of the pipe is placed in a pair of press molds.

3. The method as claimed in claim 2, wherein one of the press molds has a convex semi-circular contacting surface, while the other mold has a concave semi-circular contacting surface.

4. The method as claimed in claim 3, further comprising a step before the pressing step: shrinking the heat pipe into a shrinkage portion connecting the open portion to the pipe.

5. The method as claimed in claim 2, wherein each of the press molds has a flat contacting surface.

6. The method as claimed in claim 1, wherein during the melting operation the pipe turns on its axis.

7. The method as claimed in claim 1, wherein the tungsten arc inert gas welding is argon arc welding.

8. A method for forming a heat pipe comprising:
preparing a pipe having a closed end and an open end, the pipe having working fluid therein and being vacuum-exhausted;
cramping the open end into a two layer sealing portion;
heating a distal end of the two layer sealing portion by applying a tungsten arc inert gas welding to at least one part of the two layer sealing portion, whereby the distal end is melted; and
cooling the melted distal end into a single layer sealing portion over the two layer sealing portion, wherein the single layer sealing portion, the two layer sealing portion and the pipe are made of same metallic material.

* * * * *